(12) United States Patent
Barton

(10) Patent No.: US 7,980,131 B2
(45) Date of Patent: Jul. 19, 2011

(54) BOTTOMLESS MEASURING CUP

(76) Inventor: Jody Barton, Cornelius, NC (US)

( * ) Notice: Subject to any disclaimer, the term of this patent is extended or adjusted under 35 U.S.C. 154(b) by 376 days.

(21) Appl. No.: 12/349,377

(22) Filed: Jan. 6, 2009

(65) Prior Publication Data

US 2009/0173153 A1 Jul. 9, 2009

Related U.S. Application Data

(60) Provisional application No. 61/010,223, filed on Jan. 7, 2008.

(51) Int. Cl.
*G01F 19/00* (2006.01)
(52) U.S. Cl. ......................................................... 73/429
(58) Field of Classification Search .................... 73/426, 73/427, 428, 429
See application file for complete search history.

(56) References Cited

U.S. PATENT DOCUMENTS

| | | | | |
|---|---|---|---|---|
| 2,163,364 | A | * | 6/1939 | Quellette ........................ 73/429 |
| 2,329,437 | A | | 9/1943 | Corwin |
| 2,583,808 | A | * | 1/1952 | Bernhardt ...................... 73/429 |
| 2,625,824 | A | * | 1/1953 | Moe ................................ 73/429 |
| 2,793,530 | A | * | 5/1957 | Schultz et al. ................. 73/429 |
| 2,839,928 | A | * | 6/1958 | Fohrman ........................ 73/429 |
| 4,335,609 | A | | 6/1982 | Saulsbury |
| 4,762,251 | A | * | 8/1988 | Berger ........................... 222/49 |
| 4,981,041 | A | | 1/1991 | Merkle |
| 6,026,685 | A | * | 2/2000 | Weterrings et al. ............ 73/429 |

* cited by examiner

*Primary Examiner* — Hezron Williams
*Assistant Examiner* — Nathaniel Kolb
(74) *Attorney, Agent, or Firm* — Ronald L. Hofer

(57) ABSTRACT

A bottomless measuring cup system having a tubular container with a hollow interior and opposite open ends and a plunger having a base adapted to slidingly fit within the hollow interior of the container.

5 Claims, 1 Drawing Sheet

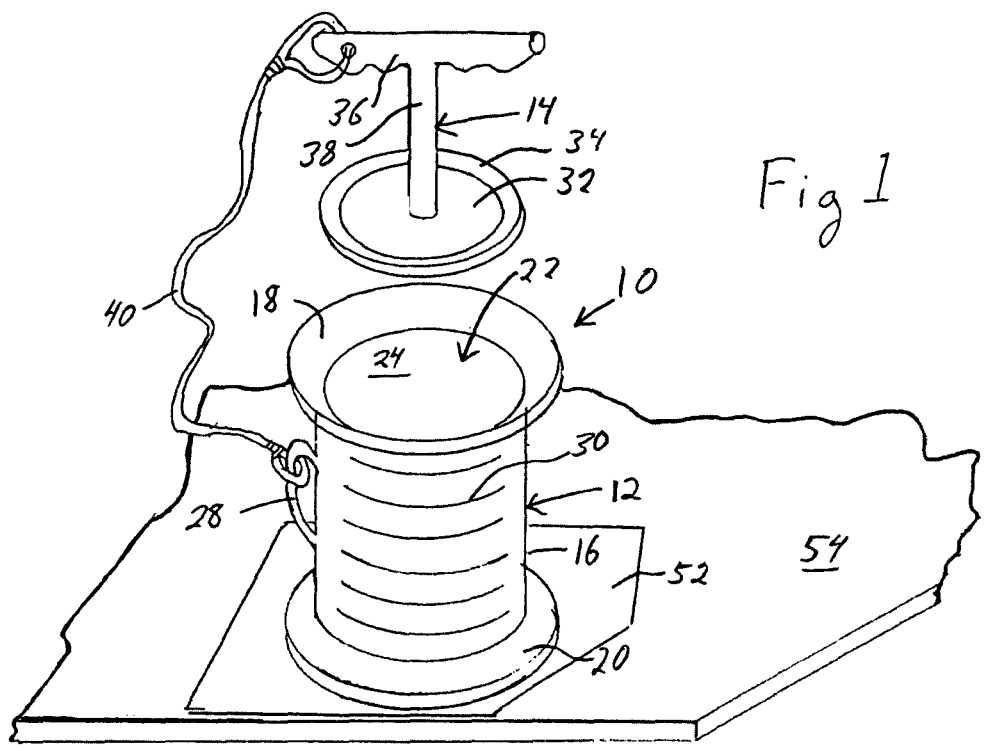
Fig 1
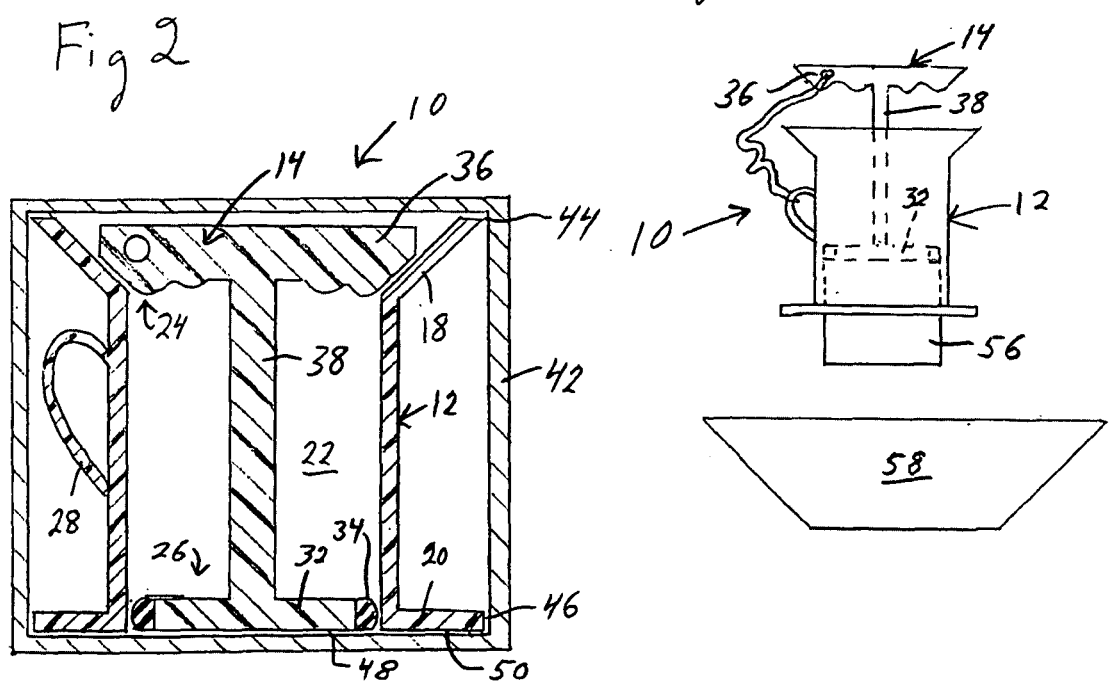
Fig 2
Fig 3

# BOTTOMLESS MEASURING CUP

FIELD OF THE INVENTION

The present invention relates to measuring cups. More specifically, the present invention relates to a combination of a measuring cup and a dispensing device, which combination is particularly useful in the culinary arts.

BACKGROUND OF THE INVENTION

Many consumers love to bake, and baking often requires certain ingredients, such as brown sugar or shortening, to be packed into a measuring cup for accurate measuring. Once such ingredients are packed into the measuring cup, it can be difficult or time consuming to remove them from the measuring cup for placement into, for example, a mixing bowl. If one has to struggle to remove all of the entire ingredients from a measuring cup with a spoon or knife, the cup may be damaged or there may be an inaccurate measurement due to ingredients that are left behind. Without a more effective way to remove ingredients, a baker can have improper measurements, which can ruin the entire recipe.

The bottomless measuring cup of the present invention offers a chef, cook, or baker a better way to measure and pour ingredients, such as brown sugar, shortening or peanut butter, into a mixing bowl. The present invention allows its user to fill the bottomless measuring cup with the intended ingredient, pack it to measure, and then simply push the ingredient through the cup and into the bowl. This will ensure proper measuring of certain things that need packed or should have air bubbles removed and will also ease their placement into the mixing container. The bottomless measuring cup of the present invention will reduce the effort required when cooking and baking, especially for those suffering from arthritis or other physical limitations. The convenience of using the bottomless measuring cup will even encourage kids to help bake.

SUMMARY OF THE INVENTION

A bottomless measuring cup system comprising a tubular container with a hollow interior and opposite open ends and a plunger having a base adapted to slidingly fit within the hollow interior of the container.

BRIEF DESCRIPTION OF THE DRAWINGS

FIG. 1 is an exploded view, in perspective, of a preferred embodiment of a bottomless measuring cup system of the present invention;

FIG. 2 is a cross-sectional view of the preferred embodiment of FIG. 1; and

FIG. 3 is a perspective view of the preferred embodiment of FIGS. 1 and 2 shown in use with a packed, measured ingredient and a mixing bowl.

DESCRIPTION OF THE INVENTION

The present invention offers a simple way to measure and add ingredients to a mixing bowl when cooking and baking. Right and left-handed users will find the bottomless measuring cup system of the present invention simple to use. Broadly speaking, the bottomless measuring cup system of this invention comprises a bottomless measuring cup and a plunger. The measuring cup or container can be made of transparent or semi-transparent glass or plastic material, can have preprinted measurements that are easy to read, and can have a handle. The system includes a plunger which can be tethered to the container. The plunger has a base that fits closely but slides within the cup so that it can be used to push ingredients out of the cup through the open bottom of the cup. The plunger facilitates the pushing of the entirety of the collected ingredients out of the cup, making entirety of the contents easy to add into the mixing bowl. The system can be made of materials which are dishwasher safe. The measuring cup can be placed on top of wax paper, a plate or countertop during filling. The bottomless measuring cup system can be made in a convenient 2-cup size or other sizes, as needed. The cup can be used with food ingredients or other items that would normally leave the hands a sticky mess. Packing mixed ingredients inside the cup will allow for a uniform size such as the case with hamburger patties and crab cakes. Use of the cup system can reduce the need to use the user's hands. The bottomless measuring cup is a universal design that is ideal for use with a number of ingredients including canned pumpkin and ricotta cheese.

Now referring to FIG. 1, a preferred embodiment of a bottomless measuring cup system of this invention is shown in exploded view and indicated generally by the numeral 10. Broadly speaking, bottomless measuring cup system 10 comprises cup or container 12 and plunger 14.

Cup 12 has a tubular body 16 with a frusto-conical or funnel-shaped top 18 and base flange 20. The interior 22 of cup 12 is, of course, hollow to allow for containment of ingredients and both upper end 24 and lower end 26 of cup 12 are open. The interior 22 of cup 12 is intended to be used for containment of comestibles or other materials to be measured. Funnel-shaped top 18 facilitates addition of material into cup 12 without spillage. Tubular body 16 has an optional cup handle 28 which can be molded integrally therewith or otherwise attached to body 16 and is intended to facilitate manipulation of cup 12 by the user. Calibrated measurement markings 30 are provided on body 16 to indicate the measure of contents therein. It is contemplated that cup 12 will be made of glass or dishwasher safe polymeric plastic, with markings 30 etched or molded therein, but cup 12 can be made of any other suitable material. Container 12 is preferably made of transparent or semi-transparent material so as to provide the user a view of measured material. Body 16 is shown in its preferable round tubular or cylindrical form but could be any shape suitable for its intended function as disclosed herein.

Plunger 14 has round base 32 with scraping edge portion 34 which slidingly fits within body 16. Plunger 14 also has plunger handle 36 which is connected to round base 32 by shaft 38. Scraping edge portion 34 is made of a resilient material such as synthetic rubber or the like well-adapted to scrape the inwardly facing surface of tubular body 16 of cup 12. Scraping edge portion 34 acts in combination with round base 32 to eject substantially all ingredients within tubular body 16 when plunger 14 is manipulated downwardly by the user. Retention line 40 loosely attaches plunger 14 to cup handle 28.

As best shown in FIG. 2, bottomless cup system 10 is designed to be readily packaged in a convenient and efficient manner. Thus, FIG. 2 shows, in cross-section, bottomless cup system 10 neatly packaged within a carton or cardboard box 42. As can be seen in FIG. 2, both funnel-shaped top 18 and base flange 20 extend radially outwardly the same distance. Cup handle 28 extends radially outwardly from cup 12 a radial distance that is not greater than the radial distance of the outward edges of funnel-shaped top 18 and base flange 20. Thus outward facing edge 44 of funnel-shaped top 18 and outward facing edge 46 of base flange 20 are substantially coplanar. Furthermore, plunger handle 36 is designed to nestle within funnel-shaped top 18 as shown in FIG. 2 and does not extend above cup 12. It should also be noted that plunger 14 has a height such the lower surface 48 of round base 32 is coplanar with the lower surface 50 of base flange 20 when plunger handle 36 is nestled within funnel-shaped top 18 to ensure complete ejection of ingredients during use of bottomless cup system 10. Plunger handle 36 has a width greater than the interior width of interior 22 of tubular body 16 to prevent any further movement of plunger 14 downwardly from its position shown in FIG. 2.

In use, bottomless measuring cup system 10 provides a convenient and efficient means by which a user can measure and deliver ingredients to a mixing bowl or the like. Referring to FIG. 1, a user can place cup 12 onto a surface such as waxed paper 52 on countertop 54 and then add ingredient material 56 into cylindrical body 16 through funnel-shaped top 18 without spillage. Then the user can insert plunger 14 into cylindrical body 16 and, if desired, force can be applied against material 56 with round base 32 of plunger 14 to compress material 56. Then, and as illustrated in FIG. 3, the user can lift cup 12 and peel waxed paper 52 from material 56 and surface 50 of base flange 20. Finally, plunger 14 is used as shown in FIG. 3 to eject material 52 out of cylindrical body 16 into mixing bowl 58.

While a preferred embodiment of a bottomless measuring cup system of the present invention has been described herein, it will be appreciated that the present invention is subject to some modification and variation and such modifications and variations are within the broad scope of this invention which is to be limited only by the following claims.

What is claimed is:

1. A bottomless measuring cup system comprising a tubular container having a hollow interior and opposite open ends and a plunger having a base adapted to slidingly fit within said hollow interior of said container wherein said tubular container has a base flange and a funnel-shaped top portion, said flange and top portion extending radially outward substantially the same distance and said plunger having a height not greater than said container and said plunger having a handle which is wider than the radius of said hollow interior and fits within said top portion.

2. A bottomless measuring cup system as in claim 1, wherein said container is comprised of a transparent material and has calibrated measurement markings.

3. A bottomless measuring cup system as in claim 1, wherein said container and said plunger are attached by a flexible line.

4. A bottomless measuring cup system as in claim 1, wherein said plunger has a scraper edge portion adapted to scrape said tubular container.

5. A bottomless measuring cup system as in claim 1, in combination with a package, said package closely fitting about said system.

* * * * *